United States Patent
Tian et al.

(10) Patent No.: US 7,411,628 B2
(45) Date of Patent: Aug. 12, 2008

(54) METHOD AND SYSTEM FOR SCALING, FILTERING, SCAN CONVERSION, PANORAMIC SCALING, YC ADJUSTMENT, AND COLOR CONVERSION IN A DISPLAY CONTROLLER

(75) Inventors: Yu T. Tian, Palo Alto, CA (US); Qifan Huang, Sunnyvale, CA (US); Li Sha, San Jose, CA (US)

(73) Assignee: Micronas USA, Inc., Santa Clara, CA (US)

( * ) Notice: Subject to any disclaimer, the term of this patent is extended or adjusted under 35 U.S.C. 154(b) by 292 days.

(21) Appl. No.: 11/120,443

(22) Filed: May 2, 2005

(65) Prior Publication Data

US 2005/0248590 A1   Nov. 10, 2005

Related U.S. Application Data

(63) Continuation-in-part of application No. 10/966,058, filed on Oct. 14, 2004, now Pat. No. 7,259,796.

(60) Provisional application No. 60/635,114, filed on Dec. 10, 2004, provisional application No. 60/568,892, filed on May 7, 2004.

(51) Int. Cl.
*H04N 1/393* (2006.01)
*H04N 7/01* (2006.01)

(52) U.S. Cl. ...................... 348/581; 348/704; 348/561; 348/578; 348/36; 382/298; 345/472; 345/660

(58) Field of Classification Search ................. 348/581, 348/704, 445, 441, 578, 36, 644, 645, 661, 348/662, 673, 687, 624, 625, 627, 561; 382/298, 382/299, 300, 260, 274; 345/472, 472.1, 345/472.2, 660, 604; 358/451; 715/815
See application file for complete search history.

(56) References Cited

U.S. PATENT DOCUMENTS

| 5,384,912 | A | | 1/1995 | Ogrinc et al. |
| 5,422,827 | A | * | 6/1995 | Niehaus ...................... 702/190 |
| 5,587,742 | A | * | 12/1996 | Hau et al. ................... 348/441 |
| 5,809,182 | A | * | 9/1998 | Ward et al. ................. 382/298 |
| 6,075,906 | A | | 6/2000 | Fenwick et al. |
| 6,108,047 | A | * | 8/2000 | Chen ......................... 348/581 |

(Continued)

OTHER PUBLICATIONS

"AVC/MPEG High-Definition Decoder", Broadcom Corporation [online] [Retrieved on Sep. 7, 2005]. Retrieved from the Internet: <URL: http://www.broadcom.com/products/Cable/HDTV-SDTV-Video,-Graphics-%26-Receiver-Chips/BCM7411>. 2 pages.

(Continued)

*Primary Examiner*—David Ometz
*Assistant Examiner*—Jean W Désir
(74) *Attorney, Agent, or Firm*—Mayer Brown LLP

(57) ABSTRACT

Techniques for performing panoramic scaling are disclosed that reduce visible distortion in a panoramic image. Further, techniques for performing combined YC adjustment and color conversion are disclosed that reduce the size and power requirements of video manipulation hardware by reducing the number of logic gates and memory buffers required when YC adjustment and color conversion are implemented as separate operations.

8 Claims, 7 Drawing Sheets

U.S. PATENT DOCUMENTS

| | | | |
|---|---|---|---|
| 6,177,922 | B1 | 1/2001 | Schiefer et al. |
| 6,281,873 | B1 | 8/2001 | Oakley |
| 6,347,154 | B1 | 2/2002 | Karanovic et al. |
| 6,563,544 | B1 * | 5/2003 | Vasquez ............... 348/447 |
| 6,618,445 | B1 | 9/2003 | Peng et al. |
| 6,661,427 | B1 * | 12/2003 | MacInnis et al. ............ 345/660 |
| 6,690,427 | B2 * | 2/2004 | Swan ............... 348/448 |
| 6,724,948 | B1 * | 4/2004 | Lippincott ............ 382/298 |
| 6,937,291 | B1 * | 8/2005 | Gryskiewicz ............ 348/581 |
| 7,058,237 | B2 * | 6/2006 | Liu et al. ............ 382/276 |
| 7,184,609 | B2 * | 2/2007 | Liu et al. ............ 382/276 |
| 2001/0046260 | A1 | 11/2001 | Molloy |
| 2003/0007562 | A1 | 1/2003 | Kerofsky et al. |
| 2003/0012276 | A1 | 1/2003 | Zhong et al. |
| 2003/0080981 | A1 * | 5/2003 | Lin et al. ............ 345/660 |
| 2003/0095711 | A1 | 5/2003 | McGuinness et al. |
| 2003/0138045 | A1 | 7/2003 | Murdock et al. |
| 2003/0156650 | A1 | 8/2003 | Campisano et al. |
| 2003/0198399 | A1 | 10/2003 | Atkins |
| 2004/0085233 | A1 | 5/2004 | Linzer et al. |
| 2004/0240559 | A1 | 12/2004 | Prakasam et al. |
| 2004/0260739 | A1 | 12/2004 | Schumann |
| 2004/0263361 | A1 | 12/2004 | Pearson et al. |
| 2005/0001745 | A1 | 1/2005 | Sankaran |
| 2007/0025723 | A1 * | 2/2007 | Baudisch et al. ............ 396/287 |

OTHER PUBLICATIONS

"BCM7411 Product Brief", Broadcom Corporation [online] [Retrieved on Dec. 8, 2005] Retrieved from the Internet: <URL: http://www.broadcom.com/collateral/pb/7411-PB05-R.pdf>. 2 pages.

"Broadcom Announces High Definition TV Decoder Reference Design Platform Featuring H.264 Advanced Video Compression", Broadcom Corporation [online] [Retrieved on Sep. 7, 2005]. Retrieved from the Internet: <URL: http://www.broadcom.com/press/release/php?id=660337. 4 pages.

Burger, Douglas et al., "Memory Systems", The Computer Science and Engineering Handbook, Ed. Allen B. Tucker, 1997, pp. 447-461, CRC Press, Boca Raton, FL.

"Differential Motion Vectors" [online] [Retrieved on Oct. 14, 2002] Retrieved from the Internet: <URL: http://www.cmlab.csie.ntu.edu.tw/cml/dsp/training/coding/h263/motion.html>. 2 pages.

"Dual Channel AVC High-Definition Reference Platform", Broadcom Corporation [online] [Retrieved on Dec. 14, 2005] Retrieved from the Internet: <URL: http://www.broadcom.com/collateral/pb/97395-PB00-R.pdf>. 2 pages.

"Dual High-Definition Digital Video System-on-Chip Solution for Cable, Satellite, and DTV", Broadcom Corporation [online] [Retrieved on Dec. 14, 2005]. Retrieved from the Internet: <URL: http://www.broadcom.com/collateral/pb/7038-PB01-R.pdf>. 2 pages.

"EM8400", Sigma Designs [online] Jan. 9, 2003 [Retrieved on Dec. 8, 2005] Retrieved from the Internet: <URL: http://www.sigmadesigns.com/pdf_docs/em8400brochure.pdf>. 2 pages.

"EM8470", Sigma Designs [online] Mar. 20, 2003 [Retrieved on Dec. 8, 2005] Retrieved from the Internet: <URL: http://www.sigmadesigns.com/pdf_docs/em847xbrochure.pdf>. 2 pages.

"EM8485", Sigma Designs [online] Apr. 30, 2003 [Retrieved on Sep. 7, 2005] Retrieved from the Internet: <URL: http://www.sigmadesigns.com/pdf_docs/EM8485brochure.pdf>. 2 pages.

"EM8500", Sigma Designs [online] Jan. 16, 2004 [Retrieved on Dec. 8, 2005] Retrieved from the Internet: <URL: http://www.sigmadesigns.com/pdf_docs/em8500_brochure.pdf>. 2 pages.

"EM8610", Sigma Designs [online] Jan. 13, 2004 [Retrieved on Dec. 8, 2005] Retrieved from the Internet: <URL: http://www.sigmadesigns.com/pdf_docs/em8610_brochure.pdf>. 2 pages.

"EM8610L", Sigma Designs [online] Aug. 2005 [Retrieved on Dec. 8, 2005] Retrieved from the Internet: <URL: http://www.sigmadesigns.com/pdf_docs/EM8610LSeries_br.pdf>. 2 pages.

"H.264 Advanced Video Coding: A Whirlwind Tour", PixelTools, [online] [Retrieved on Sep. 7, 2005] Retrieved from the Internet: <URL: http://www.pixeltools.com/h264_paper.html>. 8 pages.

"H.264/MPEG-4 Part 10 Advanced Video Coding", Moonlight Technology, [online] [Retrieved on Sep. 7, 2005] Retrieved from the Internet: <URL: http://www.moonlight.co.il/technology/h264/>. 2 pages.

"H.264 Video Decoder for HDTV", Sci-Worx [online] [Retrieved on Sep. 7, 2005] Retrieved from the Internet: <URL: http://www.sci-worx.com/uploads/media/H264VD.pdf>. 2 pages.

"ITU-T H.264—Series H: Audiovisual and Multimedia Systems Infrastructure of Audiovisual Services—Coding of Moving Video", International Telecommunication Union, Mar. 2005, pp. xiii-330.

"MPEG-4 AVC/H.264 Video Decoder", Conexant Systems, Inc. [online] [Retrieved on Dec. 8, 2005] Retrieved from the Internet: <URL: http://www.conexant.com/servlets/DownloadServlet/102551A.pdf?Fileld=1870>. 2 pages.

Schafer, Ralf et al., "The Emerging H.264/AVC Standard", EBU Technical Review, Jan. 2003, 12 pages.

Tourapis, Alexis M. et al., "Motion Vector Prediction With Reference Frame Consideration", 8 pages.

"Video DSP", TechnoWorld, Sony Corporation [online] [Retrieved on Dec. 8, 2005] Retrieved from the Internet: <URL: http://www.sony.net/Products/SC-HP/cx_news/vol13/pdf/tw_dsp.pdf>. 4 pages.

Wiegand, Thomas, "Context-Based Adaptive Coding and the Emerging H.26L Video Compression Standard", 27 pages, Heinrich Hertz Institute, Berlin, Germany.

* cited by examiner

METHOD AND SYSTEM FOR SCALING, FILTERING, SCAN CONVERSION, PANORAMIC SCALING, YC ADJUSTMENT, AND COLOR CONVERSION IN A DISPLAY CONTROLLER

CROSS-REFERENCE TO RELATED APPLICATION

This application claims the benefit of U.S. Provisional Application No. 60/635,114, filed on Dec. 10, 2004. In addition, this application is a continuation-in-part of U.S. application Ser. No. 10/966,058, filed on Oct. 14, 2004, and titled "System and Method for Rapidly Scaling and Filtering Video Data", now U.S. Pat. No. 7,259,796, which claims the benefit of U.S. Provisional Application No. 60/568,892, filed on May 7, 2004. In addition, this application is related to U.S. application Ser. No. 11/120,842, filed May 2, 2005, titled "Combined Scaling, Filtering and Scan Conversion", now published as U.S. Patent Application 2005/0251544. Each of these applications is incorporated by reference here in its entirety.

BACKGROUND OF THE INVENTION

1. Field of the Invention

The present invention relates generally to video image processing, and more particularly, to techniques for performing scaling, filtering, scan conversion, panoramic scaling, YC adjustment and color conversion on video data.

2. Background Art

Digital video is made up of many megabytes of pixel data per second of video. Processing of video data can be costly, consuming valuable resources such as memory, bandwidth, processing power, and time. Video data processing taxes even the fastest computer systems due to large image sizes and fast frame rates.

Video data consists of a series of frames or images composed of pixels arranged in rows and columns. With the advent of digital television and streaming media, a number of new techniques have been developed over the recent past to allow video data images to be processed. One type of device used for video data processing is a display controller, which converts a bitstream of pixels representing an image into analog or digital signals for output on a display device. FIG. 1 illustrates the components of a conventional display controller 100.

Input video 110 represents a bitstream of pixels that is input to scan conversion unit 120. Scan conversion unit 120 converts the input video 110 to be compatible with the scan rate of a display device such as a conventional television. For example, scan conversion unit 120 may convert the input video 110 from non-interlaced frames to interlaced frames that are suitable for output at a lower scan rate. Interlaced frames generated by scan conversion unit 120 are stored in first buffer 122. Scan conversion is followed by scaling and filtering of video data.

Scaling involves changing the resolution of a frame of video data or making an image or video frame larger or smaller than its original resolution. For example, a digital video screen may be scaled up to fit a large screen, or it may be scaled down to occupy only a portion of the screen for displaying it as a thumbnail. During downscaling, the size of a frame is reduced by removing pixels. On the other hand, up scaling involves increasing the size of a frame by adding pixels. Converting a video from NTSC (640×480) resolution to HDTV (1920×1080) resolution is an example of "scaling" the video or more specifically, of up scaling. An example of downscaling would be converting from HDTV to NTSC.

When a frame is scaled, the value of each new pixel in the scaled frame is based on the values of one or more pixels in the original frame. The calculation of each new pixel can be formulated as a linear equation in which the value of each original pixel used to calculate a new pixel is multiplied by a weight or coefficient that determines the relative weight of the original pixel in the calculation. The value of a new pixel is typically calculated based its on neighboring original pixels, with different coefficients being used for different types of scaling. A frame may be scaled vertically and/or horizontally. When a frame is scaled, the ratio of the number of output pixels to the number of input pixels is referred to as the scaling ratio. For a horizontal scaling ratio of M:N, there are M horizontal pixels in the scaled frame for every N input pixels from the original frame. For example, an up scaling of 33% can be represented by a ratio of 4:3.

Filtering involves modifying the pixels in a frame based on the desired characteristics of the output frame. For example, certain filters are used to generate a blurred version of the original frame, while other filters might enhance the edges that appear in the image. Filtering is similar to scaling in that the value of each filtered pixel is calculated based on a linear equation in which the values of one or more input pixels are multiplied by coefficients.

Referring to FIG. 1, horizontal scaling unit 124 retrieves video data from first buffer 122, adjusts the size of each row in a frame and stores the resulting frame in second buffer 126. Next, horizontal filtering unit 128 retrieves the horizontally scaled data from second buffer 126, and applies a desired filter to each row of pixels. The resulting frame, which is horizontally scaled and filtered, is stored in third buffer 130. Vertical scaling unit 132 retrieves the video data from third buffer 130, performs vertical scaling to adjust the vertical size of each input frame, and stores the resulting frame in fourth buffer 134. Vertical filtering unit 136 then retrieves the vertically scaled data from fourth buffer 134, and applies a desired filter to each column of pixels to generate a vertically filtered column that is stored in fifth buffer 138.

Pixels of video data can be represented using different color spaces or color models, such as RGB and YUV. The RGB color space refers to what humans view, which is captured by a video camera or rendered on the screen of a display device. YUV is a color encoding system used for storage and processing of video data, where each pixel is represented by a luminance or brightness (Y), and two color difference signals: blue minus luminance (U) and red minus luminance (V). The Y, U, and V components of a pixel may be represented by analog signals or by digital data in the form of bits. The process of converting between RGB and YUV color spaces is referred to as color space conversion or color conversion.

Referring to FIG. 1, YC adjustment unit 140 retrieves the scan-converted, scaled and filtered video data from fifth buffer 138. YC adjustment unit 140 adjusts the contrast, brightness and saturation of a frame by adjusting the Y, U and V components of each pixel in the frame. The output of YC adjustment unit 140 is sent to color conversion unit 142, which converts video data from the YUV color space to the RGB color space for output via a display device. The output of color conversion unit 142 comprises output video 112, which is ready for viewing on the display device.

One problem with conventional video data processing is that panoramic scaling results in distortion of an image. Panoramic scaling is required when the horizontal scaling ratio for a frame is different from the vertical scaling ratio. Panoramic scaling causes distortion because objects in the scaled frame appear elongated in the horizontal or vertical direction. For example, an input frame of resolution 1280×768 pixels may need to be converted to a resolution of 1365×768, where the horizontal scaling ratio is 1365:1280, while the vertical scaling ratio is 1:1. In the present example, objects in the output frame will appear elongated in the horizontal direction because the horizontal scaling ratio is greater than the vertical scaling ratio.

Another problem with conventional video data processing is delays introduced during separate operations of scaling, filtering, scan conversion, YC adjustment and color conversion. Video processing is most useful when it can be done at actual video speeds or faster. Video processing that occurs at slower than video speeds requires large amounts of storage and cannot be viewed in real time. Conventional display controllers implement scaling, filtering and scan conversion as separate operations. Similarly, in conventional display controllers, YC adjustment and color conversion are implemented as separate operations. These separate operations require large amounts of processing power, thereby introducing delays in video processing. Further, these separate operations require numerous logic gates and large buffers, increasing both the chip size and power consumption. This is particularly problematic for video processing system-on-chip (SOC) design, where small chip size and low power dissipation are highly desirable features.

Accordingly, there is a need for a system and method that performs panoramic scaling while reducing visible distortion in the scaled frame. Further, there is a need for a system and method for efficiently performing the operations of scaling, filtering, scan conversion, YC adjustment and color conversion on video data streams. Moreover, there is a need for reducing the size and power requirements of video manipulation hardware by reducing the number of logic gates and memory buffers required for different operations.

SUMMARY OF THE INVENTION

Various embodiments of the present invention provide a method of panoramic scaling that achieves a desired scaling ratio across an image by applying non-uniform scaling to generate one or more pixels in a panoramically scaled output line or column. For example, to achieve horizontal panoramic scaling, the method applies a horizontal scaling ratio similar to the vertical scaling ratio near the center of an output line and changes the scaling ratio used to generate pixels that are located successively further away from the center of the output line. To provide another example, the method linearly increases the scaling ratio used to generate pixels that are located successively further away from the center of the output line. Therefore, various embodiments of the present invention advantageously reduce visible distortion in a panoramically scaled image.

According to one embodiment of the present invention, to generate an output pixel in a panoramically scaled output line, the method determines a scaling ratio for the output pixel based on the horizontal scaling ratio, selects one or more input signals for generating the output pixel, and calculates corresponding weights or scaling coefficients for the input signals. The output pixel is then generated by interpolation. For example, the output pixel is generated by bilinear interpolation using two input signals. Various embodiments of the invention provide a device for performing panoramic scaling. According to one embodiment of the present invention, determining a scaling ratio for an output pixel comprises determining a step value used to select the input signal.

Various embodiments of the present invention provide a method of performing combined YC adjustment and color conversion of video data. The method first determines one or more combined coefficients for YC adjustment and color conversion. Next, the method applies the combined coefficient to the video data to achieve YC adjustment and color conversion in a single step. By combining YC adjustment and color conversion, one embodiment of the present invention advantageously reduces the size and power requirements of video manipulation hardware by reducing the number of logic gates and memory buffers required when YC adjustment and color conversion are implemented as separate operations.

According to one embodiment, at least one of the combined coefficients is a function of a YC adjustment parameter and/or a color conversion coefficient, and the value of the combined coefficient is determined by substituting a value of the YC adjustment parameter and/or the color conversion coefficient into a combined linear equation for YC adjustment and color conversion. According to a further embodiment, the step of determining the combined coefficients is performed prior to receiving the video data, thereby advantageously reducing the number of computations performed in real time. Various embodiments of the present invention provide a device for performing combined YC adjustment and color conversion.

DETAILED DESCRIPTION OF THE INVENTION

Figure 1:
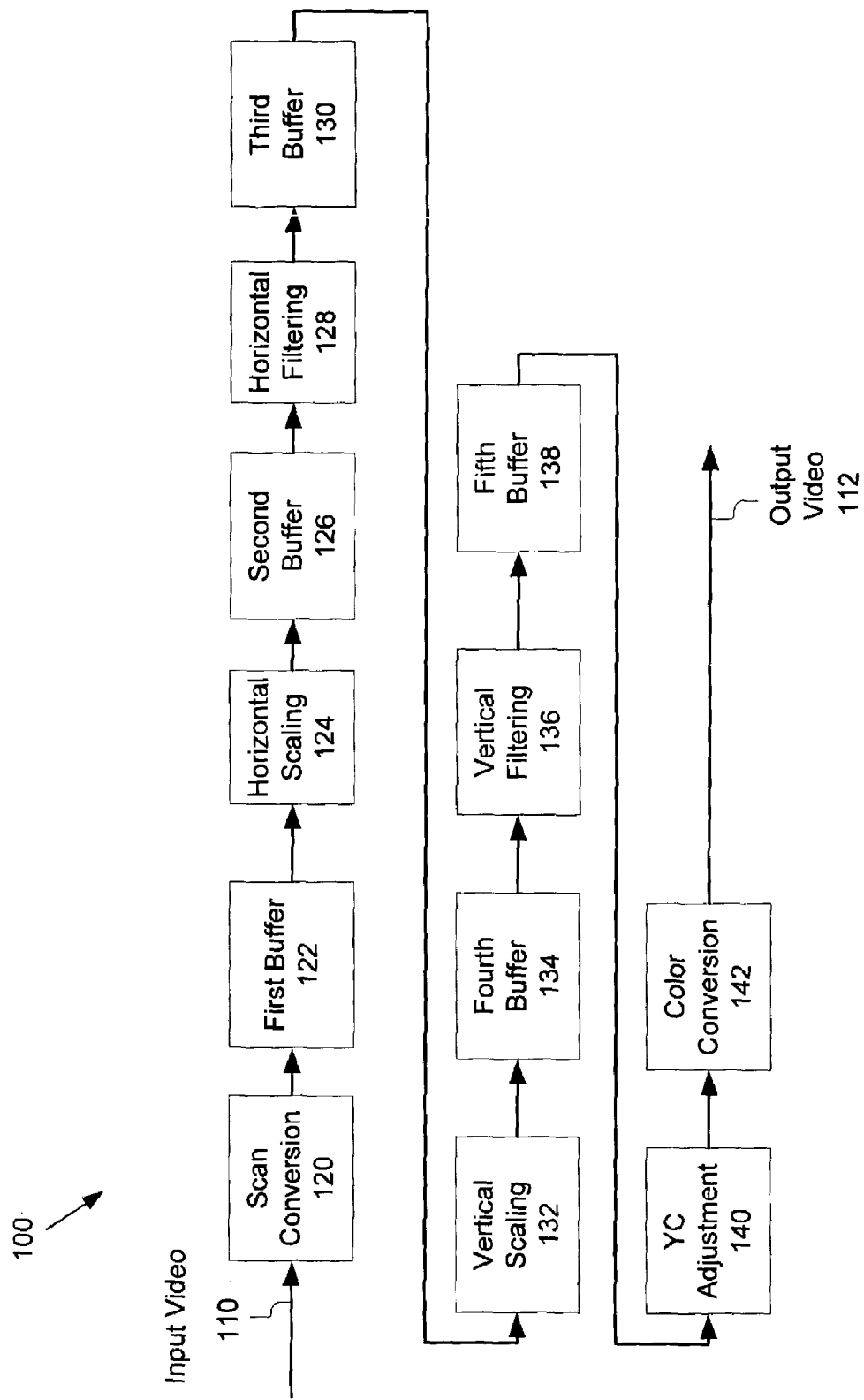
FIG. 1 is a block diagram of a video processing system according to the prior art.

Various embodiments of present invention are now described more fully with reference to the accompanying figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In the following description, for purposes of explanation, numerous specific details are set forth in order to provide a thorough understanding of the invention. It will be apparent, however, to one skilled in the art that the invention can be practiced without these specific details. In some instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the video data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the method steps. The structure for a variety of these systems will appear from the description below. In addition, the present invention is not described with reference to any particular programming language. It will be appreciated that a variety of programming languages may be used to implement the teachings of the invention as described herein. Furthermore, note that the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

In this application, the following terms are used:

"Pixel" refers to an individual picture element in an image that may be part of a video stream. An image is made up of many pixels organized into rows and columns. Each pixel independently represents a color and luminosity or brightness that may be different from surrounding pixels in the image. Subsequent images in the video stream have pixels at the same location that are independent from the pixel in the current image.

"Frame" refers to a single image in a digital video stream. For example, many digital video streams have 30 frames per second or 30 individual images that make up one second of video.

"Resolution" refers to the number of pixels in the rows and columns of the image. For instance, it may be said that the resolution of a high-definition television (HDTV) frame is 1920×1080 pixels, meaning that there are 1920 columns of pixels and 1080 rows of pixels in a single frame of an HDTV video.

"Buffer" refers to a storage mechanism whether on an integrated circuit or a defined portion of memory where intermediate values are stored in a calculation. When multiple calculations are performed on data in sequence, intermediate values are stored in a buffer while waiting for one calculation to finish and the next calculation to proceed.

A "line" of video refers to a single row of image pixels from a single frame of a video.

Techniques for implementing panoramic scaling are disclosed that reduce visible distortion in a panoramic image. Further, techniques for performing combined YC adjustment and color conversion are disclosed that reduce logic gates and/or line buffer space required in the overall design of a video processing system. These techniques can be implemented, for example, as a display controller chip, or as a display controller circuit integrated into an overall video processing system-on-chip or chip set.

Figure 2:
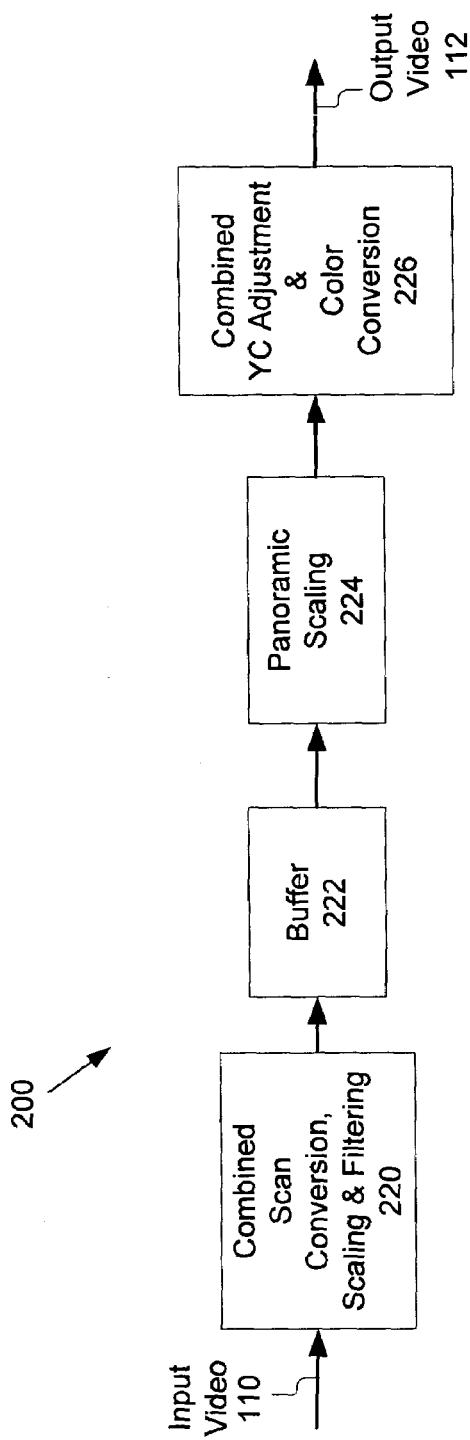
FIG. 2 is a block diagram of a system for video processing configured in accordance with one embodiment of the present invention.

Referring to FIG. 2, there is shown is a block diagram of a system for video processing according to one embodiment of the present invention. According to one embodiment of the present invention, the system 200 represents hardware for converting a stream of input video 110 to output video 112 that is suitable for output via a display device. A hardware embodiment of the invention has been described for ease of understanding. However, the modules, features, attributes, methodologies, and other aspects of the invention can be implemented as software, hardware, firmware or any combination of the three.

The system 200 preferably comprises: a combined scan conversion, scaling, and filtering module 220, a buffer 222, a panoramic scaling module 224, and a combined YC adjustment and color conversion module 226. Other modules or functionality not shown in the figure may also be included in a display controller. For instance, video processing circuitry may also include coder/decoder (CODEC) circuitry, and a direct memory access (DMA) engine and its memory.

Combined scan conversion, scaling and filtering module 220 performs combined scan conversion, scaling and filtering of video data. In one embodiment, combined scaling, filtering and scan conversion 220 is implemented as described in the previously incorporated U.S. application Ser. No. 11/120,842, filed May 2, 2005, titled "Combined Scaling, Filtering and Scan Conversion", now published as U.S. Patent Application 2005/0251544.

In an alternative embodiment, note that conventional scan conversion, scaling and filtering of video data can be performed, rather than combined scan conversion, scaling and filtering of video data.

Buffer 222 has an input and one or more outputs and is used to store pixel data for panoramic scaling. The input of buffer 222 is coupled to combined scan conversion, scaling and filtering module 220 to receive pixel data. According to one embodiment, buffer 222 is capable of storing one or more lines of pixel data. The outputs of buffer 222 are coupled to the input of panoramic scaling module 224. According to a further embodiment, each line of pixel storage in buffer 222 is connected to panoramic scaling module 224 by one output.

Therefore, if buffer 222 is capable of storing 5 lines of pixels, then buffer 222 has 5 outputs to panoramic scaling module 224, one for each line of pixels. According to one embodiment, buffer 222 stores interlaced lines of pixels that have undergone scan conversion, scaling and filtering and that are waiting for the operations of panoramic scaling, YC adjustment and color conversion to proceed before being output to a display device.

Panoramic scaling module 224 has an input and an output and is used to scale video data when the horizontal scaling ratio is different from the vertical scaling ratio. The input of panoramic scaling module 224 is connected to the output of buffer 222 to receive video data that has undergone scan conversion, scaling and filtering. According to one embodiment, uniform horizontal and vertical scaling has been applied to input video 110 before it reaches panoramic scaling module 224. The output of panoramic scaling module 224 is connected to combined YC adjustment and color conversion module 226. The present application describes one embodiment of panoramic scaling in which the horizontal scaling ratio is greater than the vertical scaling ratio. However, another embodiment of the present invention may be readily applied in situations where the vertical scaling ratio is greater than the horizontal scaling ratio.

Figure 4A:
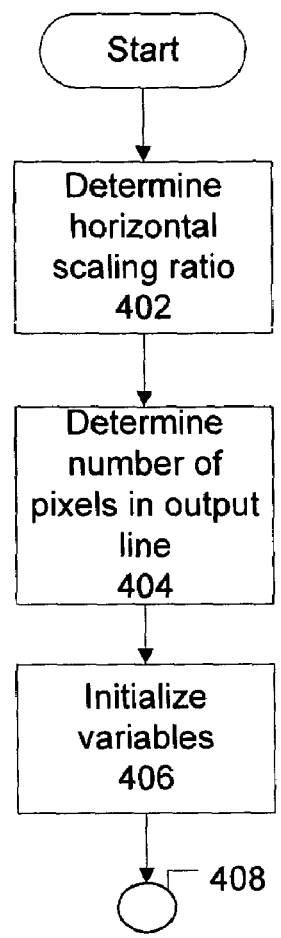
FIGS. 4A and 4B provide a flowchart of a method of panoramic scaling according to one embodiment of the present invention.
Figure 4B:
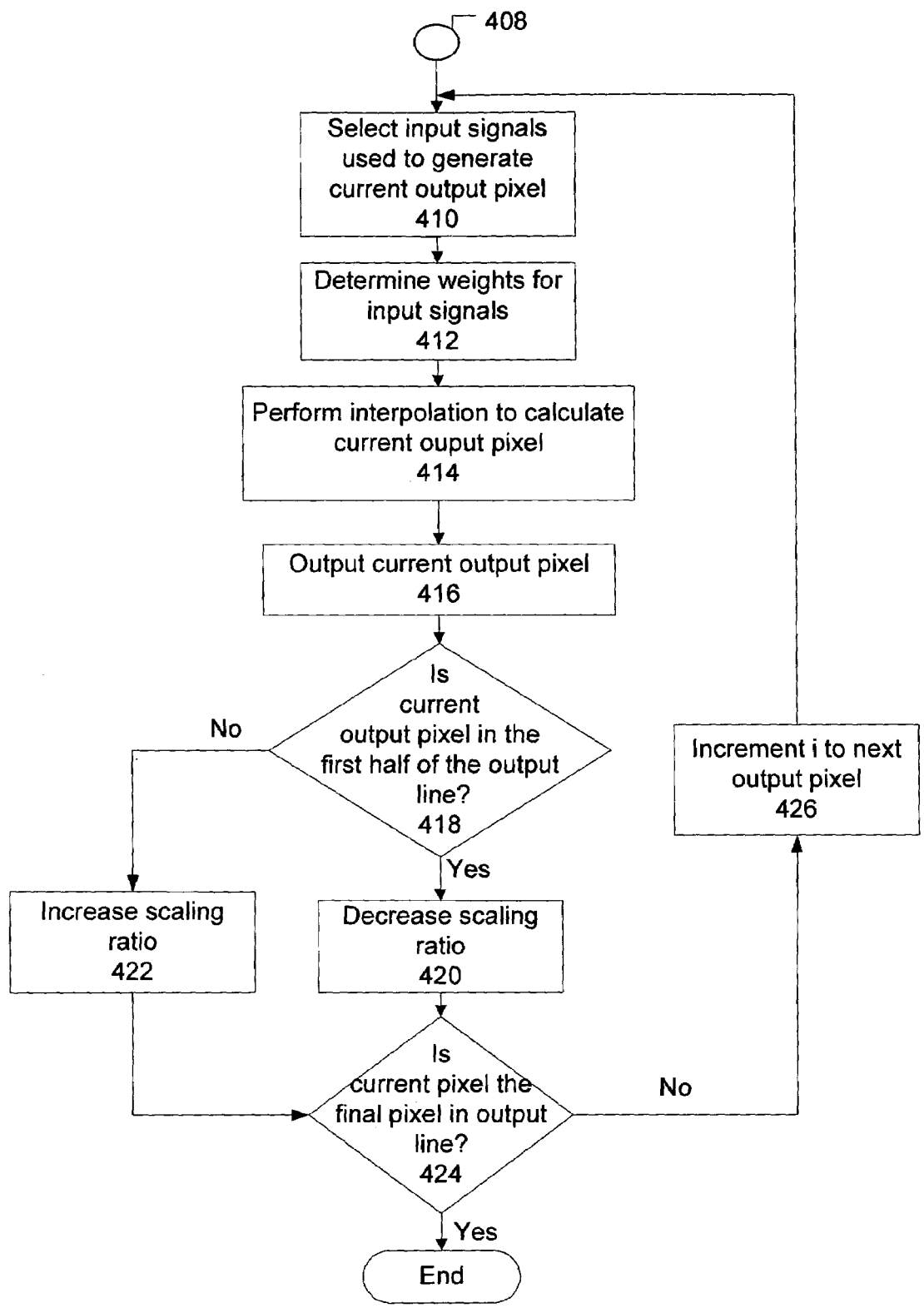
Figure 5:
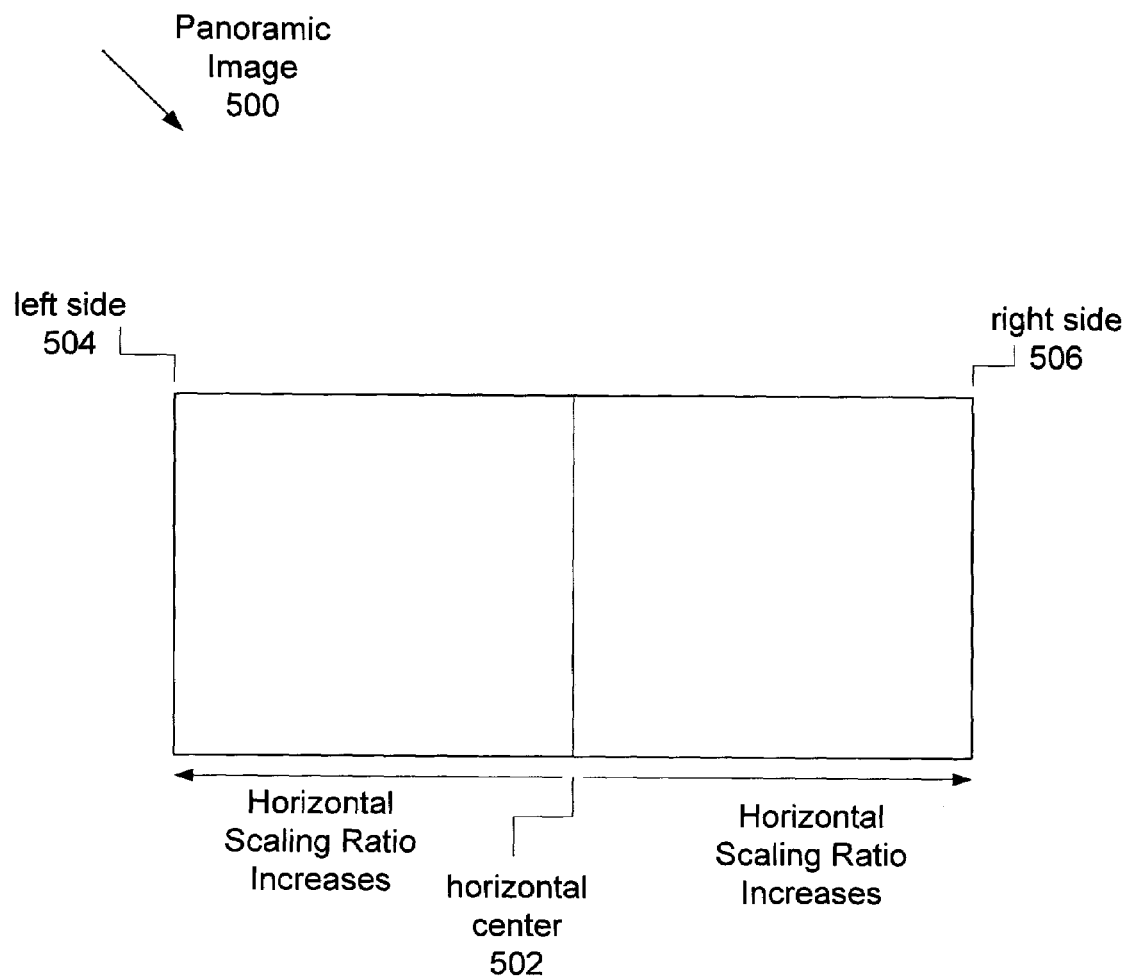
FIG. 5 is an illustration of an image generated by panoramic scaling according to one embodiment of the present invention.

Panoramic scaling module 224 scales video data to generate a panoramic frame while reducing visible distortion. FIG. 5 is an illustration of a panoramic image 500 generated by panoramic scaling according to one embodiment of the present invention. According to this embodiment, panoramic scaling module 224 applies non-uniform horizontal scaling across panoramic image 500. For example, panoramic scaling module 224 applies a horizontal scaling ratio similar to the vertical scaling ratio near the horizontal center 502 of panoramic image 500 and changes the horizontal scaling ratio going from the horizontal center 502 to either side of panoramic image 500. To provide another example, panoramic scaling module 224 increases the horizontal scaling ratio going from the horizontal center 502 to either side of panoramic image 500. Therefore, the present invention advantageously reduces visible distortion in panoramic image 500 by ensuring that the horizontal and vertical scaling ratios are similar near the center of the image. Note that panoramic scaling is not required if the vertical scaling ratio of a frame is equal to the horizontal scaling ratio, in which case panoramic scaling module will pass data through unchanged. Panoramic scaling performed by the present invention is described in more detail below with reference to FIGS. 4A and 4B.

Combined YC adjustment and color conversion module 226 has an input and an output and is used to adjust the contrast, brightness and saturation of video data and to convert the video data from one color space to another. According to one embodiment, combined YC adjustment and color conversion module 226 adjusts contrast, brightness and saturation of video data according to user-selected settings on a display device. The video is then converted from the YUV color space to the RGB color space for output via by the display device. The input of combined YC adjustment and color conversion module 226 is coupled to the output of panoramic scaling module 224 to receive video data that has undergone the operations of scan conversion, scaling, filtering and panoramic scaling. The output of combined YC adjustment and color conversion module 226 is coupled to a display device (not shown). The combined YC adjustment and color conversion performed by the present invention is described in more detail below with reference to FIG. 6.

Figure 3:
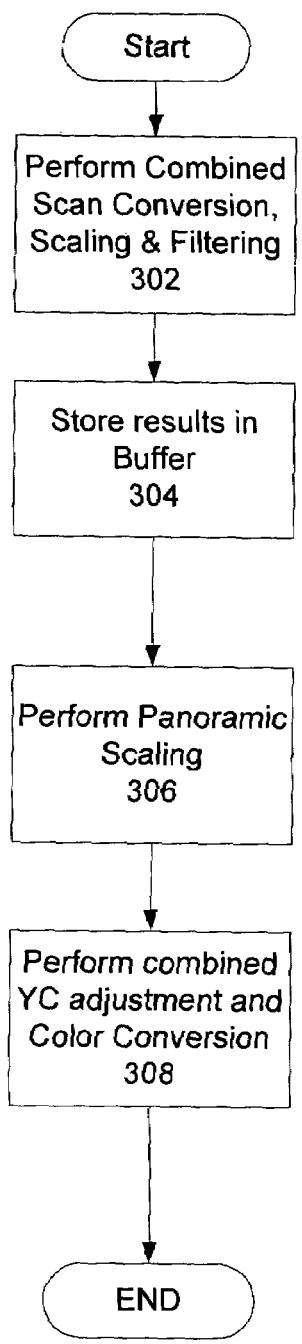
FIG. 3 is a flowchart of a method for video processing according to one embodiment of the present invention.

Referring now to FIG. 3, of a method for video processing according to one embodiment of the present invention is described. At step 302, the method performs combined scaling, filtering and scan conversion. According to one embodiment, the functionality of step 302 is described in the previously incorporated U.S. application Ser. No. 11/120,842, filed May 2, 2005, titled "Combined Scaling, Filtering and Scan Conversion", now published as U.S. Patent Application 2005/0251544.

Next, at step 306 the method performs panoramic scaling. As described above, panoramic scaling is used when different horizontal and vertical scaling ratios need to be applied to an input frame. The following discussion presents an example in which a vertical scaling ratio of 4:3 and a horizontal scaling ratio of 16:9 need to be applied to an input frame of resolution 640×480. However, note that the present invention is applicable to perform panoramic scaling for various combinations of vertical and horizontal scaling ratios on input frames of various resolutions.

In uniform horizontal scaling, the same scaling ratio is applied across a scaled output line of pixels. Similarly, in uniform vertical scaling, the same scaling ratio is applied across a scaled output column of pixels. According to one embodiment, uniform vertical scaling is applied to achieve the desired vertical scaling ratio prior to the step of panoramic scaling 306. Further, uniform horizontal scaling is applied to achieve the same horizontal scaling ratio so as to avoid distortion in the output frame. Referring to FIG. 3, according to one embodiment, uniform horizontal and vertical scaling is applied during the step of combined scan conversion, scaling and filtering 302. Therefore, prior to the step of panoramic scaling 306, exemplary input frame of resolution 640×480 has undergone uniform scaling of 4:3 in the vertical and horizontal directions. To achieve the desired horizontal scaling ratio of 16:9, the step of panoramic scaling 306 applies a further horizontal scaling ratio of 4:3.

Performing panoramic scaling at step 306 according to one embodiment is now described in more detail with reference to FIGS. 4A and 4B. FIGS. 4A and 4B provide a flowchart of a method for implementing panoramic scaling by applying non-uniform horizontal scaling to a frame when the horizontal scaling ratio to be applied is greater than the vertical scaling ratio. An exemplary algorithm for non-uniform panoramic scaling is shown in Appendix A. During non-uniform scaling, pixels in a scaled output line or column are generated using varying scaling ratios. Referring to FIG. 5, non-uniform horizontal scaling is applied across a line in panoramic image 500 as follows: a similar horizontal and vertical scaling ratio is applied near the horizontal center 502 of panoramic image 500; however, the horizontal scaling ratio is increased going from the horizontal center 502 to the either side of panoramic image 500. Returning to the above example, an input frame has been scaled by a ratio of 4:3 in the horizontal and vertical directions prior to performing panoramic scaling at step 306. Panoramic scaling is now needed to achieve a horizontal scaling ratio of 16:9 without changing the vertical scaling ratio. In the above example, the step of panoramic scaling 306 maintains the previously-achieved horizontal scaling ratio of 4:3 at the horizontal center 502 of each line of output pixels, and increases the scaling ratio moving toward the sides of each output line so as to achieve the desired scaling ratio of 16:9 across each output line. Note that a similar method of panoramic scaling is applicable where the vertical scaling ratio is greater than the horizontal scaling ratio. Therefore, the present invention advantageously reduces visible distortion in panoramic image 500 by ensuring that horizontal and vertical scaling ratios are similar near the center of the image.

The method of panoramic scaling starts at step 402 by determining the horizontal scaling ratio (M:N) to be applied for panoramic scaling, where M:N is the ratio of the number of output pixels in a panoramic scaled line to the number of pixels in the input line prior to scaling. In the above example, a horizontal and vertical scaling ratio of 4:3 has already been applied prior to panoramic scaling. Therefore, to achieve a desired horizontal scaling ratio of 16:9, the further horizontal scaling ratio needed during panoramic scaling is 4:3. Note that other embodiments are possible where no vertical or horizontal scaling has been applied prior to panoramic scaling. Once the scaling ratio for panoramic scaling has been determined, it can be stored in memory for later use.

Next, at step 404, the method determines the number of pixels to be generated for each panoramically scaled output line. According to the above example, input frame of resolution 640×480 has been scaled by a ratio of 4:3 in the horizontal and vertical directions prior to panoramic scaling, resulting in an intermediate frame of resolution 853×640. As described above, panoramic scaling is purported to apply a further horizontal scaling ratio of 4:3, resulting in an output frame of resolution 1137×640, with 1137 pixels in each output line. According to one embodiment, panoramic scaling generates pixels in an output line by applying a non-uniform scaling ratio to a corresponding input line in the intermediate frame. The following steps of the flowchart in FIGS. 4A and 4B describe a process of generating pixels in a single panoramically scaled output line based on a single input line. Note that the same steps can be repeated to generate pixels in one or more output lines or one or more output columns. For example, these steps may be performed in parallel to simultaneously generate pixels in more than one output lines.

At step 406, the method of panoramic scaling initializes various variables that are useful for generating pixels in the output line. One such variable is a counter (i) that represents the position of the current output pixel being generated. This variable is initialized to 1 for generating the first pixel in the output line. Initialization of other exemplary variables is illustrated in Appendix A. Step 408 denotes a connector between step 406 in FIG. 4A and step 410 in FIG. 4B.

At step 410, the method selects one or more input signals used to generate the current output pixel. According to one embodiment of the present invention illustrated in Appendix A, which input signals are selected is determined by the scaling ratio to be used for the current output pixel. For example, to achieve a high horizontal scaling ratio in a particular portion of the output line, the same input pixels can be used to generate several output pixels. To provide another example, to maintain the horizontal scaling ratio from the input line in particular portion of the output line, the number of output pixels is equal to the number of input pixels in that portion of the output line. According to one embodiment, pixels in the input line are stored in a line buffer, and step 410 determines one or more indices to the buffer that correspond to the selected input signals. Note that a variable number of input signals may be used to generate the current output pixel. For example, a 5-tap filter uses 5 pixels from the current input line to generate the current output pixel. Appendix A provides another example, in which two input signals represented by the indices floor_idx and ceil_idx are used to generate the current output pixel.

At step 412, the method determines one or more weights to be applied to one or more selected input signals for generating the current output pixel. One embodiment of the present invention provides for a non-uniform scaling ratio across the output line. For non-uniform scaling, the weights applied to generate a current output pixel are calculated based on the desired scaling ratio for the current output pixel, which in turn depends upon the location of the pixel in the output line. According to one embodiment of the present invention, a high scaling ratio is applied to generate output pixels near the edges of a panoramic image, while a lower scaling ratio is applied to generate output pixels near the center of the image. Determining the desired scaling ratio for successive pixels in the output line is described in more detail below at steps 418 through 422.

Once input signals have been selected and appropriate weights have been calculated, at step 414 the method calculates the current output pixel by performing interpolation using the input signals and their corresponding weights. According to one embodiment illustrated in Appendix A, at step 414 the method performs bilinear interpolation to determine the current output pixel. For example, Appendix A illustrates an exemplary 2-tap filter for calculating the current $i^{th}$ output pixel, which is stored in the memory location referenced by a pointer pOut. An exemplary 2-tap filter for calculating the current output pixel is shown in equation (1) below, where $P_1$ and $P_2$ represent the two input signals selected to generate the current output pixel, and W1 and W2 represent the corresponding weights. As seen in equation (1), calculation of the current output pixel involves a sum of the products of each input signal and its corresponding weight. Note that a variable number of input signals may be used to calculate the current output pixel. For example, at step 414 the method may perform interpolation by using 5 input signals and their corresponding weights to calculate the current output pixel.

$$\text{Current output pixel} = W_1 P_1 + W_2 P_2 \qquad (1)$$

Next, at step 416, the method outputs the current output pixel. According to one embodiment illustrated in Appendix A, the current output pixel is outputted to a location in memory represented by pOut. According to another embodiment, the current output pixel is outputted directly to combined YC adjustment and color conversion module 226 for further video processing.

According to an embodiment described above with reference to FIG. 5, input signals and weights are selected to achieve a high scaling ratio toward the sides of panoramic image 500 and to reduce the scaling ratio moving toward the center of panoramic image 500. For purposes of the present discussion, output pixels are processed from the left side 504 of an output line to the right side 506. At step 418, the method checks whether the current output pixel is located in the first half of the output line, between left side 504 and horizontal center 502. If the current output pixel is located in the first half of the output line, the method continues with step 420 by decreasing the horizontal scaling ratio for the next output pixel so as to reduce the distortion caused by panoramic scaling toward the horizontal center 502 of panoramic image 500. On the other hand, if the current output pixel is not located in the first half of horizontal output line 418, then the method continues with step 422 by increasing the scaling ratio for output pixels moving away from horizontal center 502 to right side 506 of panoramic image 500. According to one embodiment, the scaling ratio may be linearly decreased moving from the left side 504 of panoramic image 500 to its center 502, and linearly increased moving from the center 502 of panoramic image 500 to the right side 506. The adjusted scaling ratio determined at step 420 or step 422 is used to determine input signals and their weights for calculating the next output pixel, as described above with reference to steps 410, 412. According to one embodiment of the present invention shown in Appendix A, the scaling ratio is modified across a line of output pixels by determining a step value n that is used to select one or more input signals.

For example, as shown in Appendix A, the step value n is increased moving from the left side of the output line to its center so as to decrease the scaling ratio. According to one embodiment, increasing the step value n decreases the scaling ratio because fewer output pixels are generated per input pixel, thereby resulting in less scaling of the input line. As shown in Appendix A, the step value n is decreased for generating output pixels moving from the center of an output line to the right side of the output line. According to one embodiment, decreasing the step value n increases the scaling ratio because more output pixels are generated per input pixel, thereby resulting in more scaling of the output line.

At step 424, the method determines whether the current output pixel is the final pixel in the output line. If there are more pixels to be generated for the current output line, the method increments i to the position of the next output pixel and repeats steps 410 through 424 to generate the next output pixel based on the desired scaling ratio that was previously determined at steps 420 or 422 above. If there are no more pixels to be generated for the current output line, panoramic scaling for the current output line ends.

Referring back to FIG. 3, at step 308 the method performs combined YC adjustment and color conversion. According to one embodiment illustrated in FIG. 3, combined YC adjustment and color conversion is performed on video data that has previously undergone the video post-processing operations of scan conversion, scaling, filtering and panoramic scaling. However, note that combined YC adjustment and color conversion may be performed on video data that has undergone different forms of processing prior to step 308.

Figure 6:
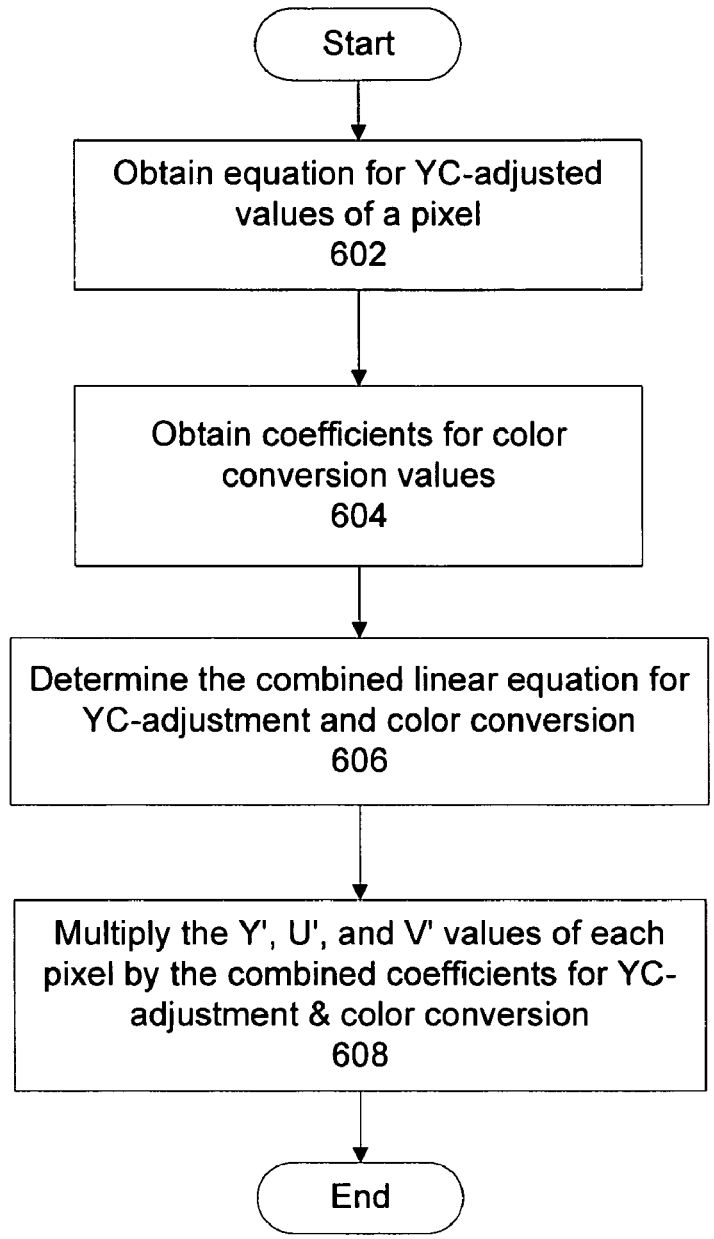
FIG. 6 is a flowchart of a method of combining YC adjustment and color conversion according to one embodiment of the present invention.

According to one embodiment, YC adjustment refers to adjusting the contrast brightness and saturation of video data. For example, the contrast, brightness and saturation of video data may be adjusted according to user-selected settings on a display device. Color conversion refers to the process of converting video data between different color spaces. A few exemplary color spaces include RGB, YUV, and YIQ. FIG. 6 is a flowchart of one embodiment of a method of combining YC adjustment and color conversion in which video data is converted from the YUV color space to the RGB color space for rendering on a display device. Various embodiments of the present invention provide a method for combining various forms of YC adjustment with color conversion between various types of color spaces. Performing combined YC adjustment and color conversion 308 is now described in more detail with reference to the exemplary embodiment in FIG. 6.

According to one embodiment, the luminosity and color difference signals for each pixel (Y, U, and V) are converted to modified luminosity and color difference signals (Y', U', and V') prior to combined YC adjustment and color conversion, as shown in equations (2) through (4) below.

$$Y' = \max(0, Y-16) \quad (2)$$

$$U' = U-128 \quad (3)$$

$$V' = V-128 \quad (4)$$

According to an embodiment, the method of combined YC adjustment and color conversion starts at step 602 by obtaining equations for computing the YC-adjusted values ($Y_{yc}$, $U_{yc}$ and $V_{yc}$) of each pixel in a stream of video data. Exemplary equations for YC adjustment are shown in equations (5), (6), and (7) below, where c represents desired contrast, b represents desired brightness, s represents desired saturation for an output image, and θ represents desired hue. According to one embodiment, the value of contrast lies between 0 and 2, the value of saturation lies between 0 and 2, the value of brightness lies between −128 through 127, and the value of angle θ lies between −30° through 30°.

$$Y_{yc} = c \cdot Y' + b \quad (5)$$

$$U_{yc} = s \cdot (U' \cos(\theta) + V' \sin(\theta)) \quad (6)$$

$$V_{yc} = s \cdot (V' \cos(\theta) - U' \sin(\theta)) \quad (7)$$

At step 604 the method of combined YC adjustment and color conversion obtains the coefficients for color conversion. Color conversion of YC-adjusted values of a pixel to the RGB color space is represented by equation (8) below. In conventional video post-processing, YC adjustment and color conversion are implemented as separate operations in a display controller. These separate operations require large amounts of processing power, thereby introducing delays in video processing. Further, these separate operations require numerous logic gates and buffers, increasing both the die size and energy requirements of the chip.

Equation (8) illustrates the color conversion coefficients ($c_{ij}$) in matrix form. According to one embodiment, the absolute value of an exemplary color conversion coefficient lies between 0 and 3.

$$\begin{bmatrix} R \\ G \\ B \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} Y_{yc} \\ U_{yc} \\ V_{yc} \end{bmatrix} \quad (8)$$

At step 606 the method determines the combined linear equation for YC adjustment and color conversion. According to one embodiment, the combined linear equation for YC adjustment and color conversion is derived by performing the matrix multiplication in equation (9) below, followed by regrouping the coefficients of Y', U' and V' to obtain the combined linear equation for YC adjustment and color conversion illustrated in equation (10) below.

$$\begin{bmatrix} R \\ G \\ B \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} c \cdot Y' + b \\ s \cdot (U' \cdot \cos\theta + V' \cdot \sin\theta) \\ s \cdot (V' \cdot \cos\theta - U' \cdot \sin\theta) \end{bmatrix} \quad (9)$$

$$\begin{bmatrix} R \\ G \\ B \end{bmatrix} = \begin{bmatrix} c \cdot C_{11} & s \cdot (C_{12} \cdot \cos\theta - C_{13} \cdot \sin\theta) & s \cdot (C_{12} \cdot \sin\theta + C_{13}\cos\theta) \\ c \cdot C_{21} & s \cdot (C_{22} \cdot \cos\theta - C_{23} \cdot \sin\theta) & s \cdot (C_{22} \cdot \sin\theta + C_{23}\cos\theta) \\ c \cdot C_{31} & s \cdot (C_{32} \cdot \cos\theta - C_{33} \cdot \sin\theta) & s \cdot (C_{32} \cdot \sin\theta + C_{33}\cos\theta) \end{bmatrix} \begin{bmatrix} Y' \\ U' \\ V' \end{bmatrix} + \begin{bmatrix} C_{11}b \\ C_{21}b \\ C_{31}b \end{bmatrix} \quad (10)$$

Equation (10) provides an exemplary equation for combining YC adjustment and color conversion, which is based on an exemplary method of YC adjustment illustrated in equations (5), (6) and (7), and an exemplary method of color conversion shown in equation (8). Various other embodiments of the present invention provide for combining various different methods for YC adjustment in a single step with various different methods for color conversion.

According to one embodiment, equation (10) advantageously provides combined coefficients for YC adjustment and color conversion. According to the one embodiment illustrated in FIG. 10, these combined coefficients are functions of parameters such as contrast, brightness, saturation, angle θ, and color conversion coefficients. Note that these combined coefficients are constant for selected parameters and color conversion coefficients. Since the values of these combined coefficients need not vary depending on the current pixel being processed, these coefficients only need to be calculated once for each selection of parameters and color conversion coefficients. Therefore, an embodiment of the present invention advantageously allows the combined coefficients for YC adjustment and color conversion to be pre-calculated, thereby allowing efficient processing of video data by reducing the number of calculations performed in real-time.

buffers to be shared across different video processing operations.

The above description is included to illustrate the operation of exemplary embodiments and is not meant to limit the scope of the invention. The scope of the invention is to be limited by only the following claims. From the above discussion, many variations will be apparent to one skilled in the relevant art that would yet be encompassed by the spirit and scope of the invention.

APPENDIX A

PANOROMIC SCALING ALGORITHM ACCORDING TO ONE
EMBODIMENT OF THE PRESENT INVENTION

```
[Assume horizontal scaling ratio for panoramic scaling is M : N]
/* Calculate the destination width, width is the source width */
outHsize = M * width / N;
half = outHsize / 2;
m = outHsize-1;
n = width-1;
/* Initialize Starting Position */
s0_32 = 0;
/* From scaling ratio m and n, calculate Step and Delta value */
/* Calculate initial Step value as floating-point value */
n0 = (2.0*n*m – m*m – 3.0*n + 2.0*m) / (double) (m*m – m);
/* Calculate initial Step value as Fixed-point value. An exemplary value for the
SCALE_FACTOR is 2^30 */
n0_32 = (UINT32) (n0 * SCALE_FACTOR);
/* Calculate Delta as floating-point value */
delta = 4.0 * (double) (m – n) / (double) (m*m – m);
/* Calculate Delta as fixed-point value */
delta_32 = (UINT32) (delta * SCALE_FACTOR);
/* After calculating parameters Starting Position, Step, and Delta, panorama scaling
algorithm starts */
/* pIn and pOut are arrays for input and output data, respectively */
*pOut++ = pIn[s0_32]; /* The 1st input pixel is the same as the 1st output pixel */
n = n0_32; /* Variable n represents Step value, assign the initial Step value to it. */
sum = s0_32+n; /* Variable sum represents the value used to find the indices for input
signals */
for (i=1; i < outHsize; i+) {
    /* Determine the indices for input signals used to generate the current ouput pixel
    */
    floor_idx = (UINT32) (sum / SCALE_FACTOR);
    ceil_idx = floor_idx + 1;
    /* Determine the weight/s for bilinear interpolation */
    w0 = (sum – floor_idx * SCALE_FACTOR + 33554432) >> 26;
    /* Calculate the output pixel using bilinear interpolation */
    *pOut = ((16 – w0) * pIn[floor_idx] + w0 * pIn[ceil_idx] + 8) >> 4;
    /* Update the pointer to the output pixel */
    pOut++;
    /* Update the next Step value: increasing the value by delta if the current output
    pixel is toward the left of the center, and decreasing the value by delta if the
    current output pixel is toward the rigth of the center. */
    if (i <= (half – 1))
        n += delta_32;
    else
        n –= delta_32;
    /* Update sum by Step */
    sum += n;
}
```

At step 608, the method performs combined YC adjustment and color conversion by multiplying the luminosity and color difference signals for a pixel in the video stream by the combined coefficients for YC adjustment and color conversion. According to one embodiment of the present invention, step 608 is the only step performed in real-time for combined YC adjustment and color conversion. By combining YC adjustment and color conversion in a single step, efficient video processing is enabled by reducing the number of calculations, such as multiplications, required during YC adjustment and color conversion. Moreover, the present advantageously reduces the size and power requirements of video manipulation hardware by allowing logic gates and memory

What is claimed is:

1. A method of applying panoramic scaling to an input line to generate an output line, comprising:
   receiving one or more pixels in the input line;
   determining a horizontal scaling ratio to be applied for panoramic scaling; and
   applying non-uniform scaling to generate one or more pixels in the output line so as to achieve the horizontal scaling ratio by:
   determining a scaling ratio for an output pixel in the output line based on the horizontal scaling ratio;
   selecting an input signal to generate the output pixel;

calculating a weight corresponding to the input signal; and performing interpolation to generate the output pixel using the weight and the input signal.

2. The method of claim 1, wherein applying the non-uniform scaling comprises:

applying a scaling ratio similar to a vertical scaling ratio for generating an output pixel near a center of the output line; and changing the scaling ratio for generating output pixels that are located successively further away from the center of the output line.

3. The method of claim 2, wherein changing the scaling ratio comprises increasing the scaling ratio for generating the output pixels that are located successively further away from the center of the output line.

4. The method of claim 1, wherein determining the scaling ratio for the output pixel comprises determining a step value used to select the input signal.

5. A method of applying panoramic scaling to an input column to generate an output column, comprising:

receiving one or more pixels in the input column;

determining a vertical scaling ratio to be applied for panoramic scaling; and applying non-uniform scaling to generate one or more pixels in the output column so as to achieve the vertical scaling ratio by determining a scaling ratio for an output pixel in the output column based on the vertical scaling ratio;

selecting an input signal to generate the output pixel;

calculating a weight corresponding to the input signal; and performing interpolation to generate the output pixel using the weight and the input signal.

6. The method of claim 5, wherein applying the non-uniform scaling comprises:

applying a scaling ratio similar to a horizontal scaling ratio for generating an output pixel near a center of the output column; and changing the scaling ratio for generating output pixels that are located successively further away from the center of the output column.

7. The method of claim 6, wherein changing the scaling ratio comprises increasing the scaling ratio for generating the output pixels that are located successively further away from the center of the output column.

8. The method of claim 5, wherein determining the scaling ratio for the output pixel comprises determining a step value used to select the input signal.

* * * * *